United States Patent [19]

Gajski et al.

[11] 4,012,722
[45] Mar. 15, 1977

[54] HIGH SPEED MODULAR MASK GENERATOR

[75] Inventors: Daniel Danko Gajski, Philadelphia; Bhalchandra Ramchandra Tulpule, Frazer, both of Pa.

[73] Assignee: Burroughs Corporation, Detroit, Mich.

[22] Filed: Sept. 20, 1975

[21] Appl. No.: 618,269

[52] U.S. Cl. .......................................... 340/172.5
[51] Int. Cl.$^2$ .......................................... G06F 7/00
[58] Field of Search .................. 445/1; 340/172.5

[56] References Cited

UNITED STATES PATENTS

| | | | |
|---|---|---|---|
| 3,454,929 | 7/1969 | Hynes | 340/172.5 |
| 3,569,939 | 3/1971 | Doblmaier | 340/172.5 |
| 3,609,702 | 9/1971 | Gardner et al. | 340/172.5 |
| 3,846,759 | 11/1974 | Drake et al. | 340/172.5 |
| 3,892,957 | 7/1975 | Bryant | 340/172.5 X |
| 3,905,025 | 9/1975 | Davis et al. | 340/172.5 |

*Primary Examiner*—Mark E. Nusbaum
*Attorney, Agent, or Firm*—K. R. Peterson; E. J. Feeney, Jr.; L. C. Brenner

[57] ABSTRACT

A high speed modular masking circuit having utility in field extraction, bit checking, and other like operations includes a plurality of input address lines for receiving binary numerical representations, two control lines, and a plurality of output masking lines, the number of output lines being equal in number to two raised in power to the number of input lines. When both control lines are at the same binary logic level, that level is likewise present on all output lines. When otherwise, a number of contiguous ones or zeroes are present on the output lines starting at the first output line, the number of ones or zeroes being equal to the binary numerical representation present at the input address lines and the number being either ones or zeroes depending upon the logic levels present on the control lines. The modular masking circuit is adaptable to various embodiments suitable for SSI, MSI, and LSI. Furthermore, the modular aspect of the masking circuit permits universal application over a wide range of masking tasks.

8 Claims, 9 Drawing Figures

Fig. 1A

| TYPE | INPUTS | | | | | | OUTPUTS | | | | | | | | | | | | | | | |
|---|---|---|---|---|---|---|---|---|---|---|---|---|---|---|---|---|---|---|---|---|---|---|
| | $E_1$ | $E_2$ | $A_3$ | $A_2$ | $A_1$ | $A_0$ | $M_{15}$ | $M_{14}$ | $M_{13}$ | $M_{12}$ | $M_{11}$ | $M_{10}$ | $M_9$ | $M_8$ | $M_7$ | $M_6$ | $M_5$ | $M_4$ | $M_3$ | $M_2$ | $M_1$ | $M_0$ |
| COMPLEMENT MASK VECTOR | 0 | 0 | X | X | X | X | 0 | 0 | 0 | 0 | 0 | 0 | 0 | 0 | 0 | 0 | 0 | 0 | 0 | 0 | 0 | 0 |
| | 0 | 1 | 0 | 0 | 0 | 0 | 1 | 1 | 1 | 1 | 1 | 1 | 1 | 1 | 1 | 1 | 1 | 1 | 1 | 1 | 1 | 1 |
| | 0 | 1 | 0 | 0 | 0 | 1 | 0 | 1 | 1 | 1 | 1 | 1 | 1 | 1 | 1 | 1 | 1 | 1 | 1 | 1 | 1 | 1 |
| | 0 | 1 | 0 | 0 | 1 | 0 | 0 | 0 | 1 | 1 | 1 | 1 | 1 | 1 | 1 | 1 | 1 | 1 | 1 | 1 | 1 | 1 |
| | 0 | 1 | 0 | 0 | 1 | 1 | 0 | 0 | 0 | 1 | 1 | 1 | 1 | 1 | 1 | 1 | 1 | 1 | 1 | 1 | 1 | 1 |
| | 0 | 1 | 0 | 1 | 0 | 0 | 0 | 0 | 0 | 0 | 1 | 1 | 1 | 1 | 1 | 1 | 1 | 1 | 1 | 1 | 1 | 1 |
| | 0 | 1 | 0 | 1 | 0 | 1 | 0 | 0 | 0 | 0 | 0 | 1 | 1 | 1 | 1 | 1 | 1 | 1 | 1 | 1 | 1 | 1 |
| | 0 | 1 | 0 | 1 | 1 | 0 | 0 | 0 | 0 | 0 | 0 | 0 | 1 | 1 | 1 | 1 | 1 | 1 | 1 | 1 | 1 | 1 |
| | 0 | 1 | 0 | 1 | 1 | 1 | 0 | 0 | 0 | 0 | 0 | 0 | 0 | 1 | 1 | 1 | 1 | 1 | 1 | 1 | 1 | 1 |
| | 0 | 1 | 1 | 0 | 0 | 0 | 0 | 0 | 0 | 0 | 0 | 0 | 0 | 0 | 1 | 1 | 1 | 1 | 1 | 1 | 1 | 1 |
| | 0 | 1 | 1 | 0 | 0 | 1 | 0 | 0 | 0 | 0 | 0 | 0 | 0 | 0 | 0 | 1 | 1 | 1 | 1 | 1 | 1 | 1 |
| | 0 | 1 | 1 | 0 | 1 | 0 | 0 | 0 | 0 | 0 | 0 | 0 | 0 | 0 | 0 | 0 | 1 | 1 | 1 | 1 | 1 | 1 |
| | 0 | 1 | 1 | 0 | 1 | 1 | 0 | 0 | 0 | 0 | 0 | 0 | 0 | 0 | 0 | 0 | 0 | 1 | 1 | 1 | 1 | 1 |
| | 0 | 1 | 1 | 1 | 0 | 0 | 0 | 0 | 0 | 0 | 0 | 0 | 0 | 0 | 0 | 0 | 0 | 0 | 1 | 1 | 1 | 1 |
| | 0 | 1 | 1 | 1 | 0 | 1 | 0 | 0 | 0 | 0 | 0 | 0 | 0 | 0 | 0 | 0 | 0 | 0 | 0 | 1 | 1 | 1 |
| | 0 | 1 | 1 | 1 | 1 | 0 | 0 | 0 | 0 | 0 | 0 | 0 | 0 | 0 | 0 | 0 | 0 | 0 | 0 | 0 | 1 | 1 |
| | 0 | 1 | 1 | 1 | 1 | 1 | 0 | 0 | 0 | 0 | 0 | 0 | 0 | 0 | 0 | 0 | 0 | 0 | 0 | 0 | 0 | 1 |
| MASK VECTOR | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 1 | 0 | 0 | 0 | 0 | 1 | 1 | 0 | 0 | 0 | 0 | 0 | 0 | 0 | 0 | 0 | 0 | 0 | 0 | 0 | 0 | 0 |
| | 1 | 0 | 0 | 0 | 1 | 0 | 1 | 1 | 0 | 0 | 0 | 0 | 0 | 0 | 0 | 0 | 0 | 0 | 0 | 0 | 0 | 0 |
| | 1 | 0 | 0 | 0 | 1 | 1 | 1 | 1 | 1 | 0 | 0 | 0 | 0 | 0 | 0 | 0 | 0 | 0 | 0 | 0 | 0 | 0 |
| | 1 | 0 | 0 | 1 | 0 | 0 | 1 | 1 | 1 | 1 | 0 | 0 | 0 | 0 | 0 | 0 | 0 | 0 | 0 | 0 | 0 | 0 |
| | 1 | 0 | 0 | 1 | 0 | 1 | 1 | 1 | 1 | 1 | 1 | 0 | 0 | 0 | 0 | 0 | 0 | 0 | 0 | 0 | 0 | 0 |
| | 1 | 0 | 0 | 1 | 1 | 0 | 1 | 1 | 1 | 1 | 1 | 1 | 0 | 0 | 0 | 0 | 0 | 0 | 0 | 0 | 0 | 0 |
| | 1 | 0 | 0 | 1 | 1 | 1 | 1 | 1 | 1 | 1 | 1 | 1 | 1 | 0 | 0 | 0 | 0 | 0 | 0 | 0 | 0 | 0 |
| | 1 | 0 | 1 | 0 | 0 | 0 | 1 | 1 | 1 | 1 | 1 | 1 | 1 | 1 | 0 | 0 | 0 | 0 | 0 | 0 | 0 | 0 |
| | 1 | 0 | 1 | 0 | 0 | 1 | 1 | 1 | 1 | 1 | 1 | 1 | 1 | 1 | 1 | 0 | 0 | 0 | 0 | 0 | 0 | 0 |
| | 1 | 0 | 1 | 0 | 1 | 0 | 1 | 1 | 1 | 1 | 1 | 1 | 1 | 1 | 1 | 1 | 0 | 0 | 0 | 0 | 0 | 0 |
| | 1 | 0 | 1 | 0 | 1 | 1 | 1 | 1 | 1 | 1 | 1 | 1 | 1 | 1 | 1 | 1 | 1 | 0 | 0 | 0 | 0 | 0 |
| | 1 | 0 | 1 | 1 | 0 | 0 | 1 | 1 | 1 | 1 | 1 | 1 | 1 | 1 | 1 | 1 | 1 | 1 | 0 | 0 | 0 | 0 |
| | 1 | 0 | 1 | 1 | 0 | 1 | 1 | 1 | 1 | 1 | 1 | 1 | 1 | 1 | 1 | 1 | 1 | 1 | 1 | 0 | 0 | 0 |
| | 1 | 0 | 1 | 1 | 1 | 0 | 1 | 1 | 1 | 1 | 1 | 1 | 1 | 1 | 1 | 1 | 1 | 1 | 1 | 1 | 0 | 0 |
| | 1 | 0 | 1 | 1 | 1 | 1 | 1 | 1 | 1 | 1 | 1 | 1 | 1 | 1 | 1 | 1 | 1 | 1 | 1 | 1 | 1 | 0 |
| | 1 | 1 | X | X | X | X | 1 | 1 | 1 | 1 | 1 | 1 | 1 | 1 | 1 | 1 | 1 | 1 | 1 | 1 | 1 | 1 |

_Fig.5_

_Fig.6_

HIGH SPEED MODULAR MASK GENERATOR

BACKGROUND OF THE INVENTION

In high speed digital data processing systems data masking circuits find application in field extraction, bit checking and similar operations. The masking circuits generate a selectable pattern of ones and zeroes which are combined in AND circuit networks with data words to selectively delete or mask portions, fields, or bits thereof. As such, masking circuits may be used to read or write bits into or out of a selected portion of a register or memory location.

The broad concept of masking is known in the prior art as demonstrated by the apparatus disclosed in U.S. Pat. No. 3,343,139 issued Sept. 19, 1967 to W. Ulrich and in U.S. Pat. No. 3,482,216 issued Dec. 2, 1969 to E. Geissler. In the prior art, masking circuits have been developed and designed to meet specific parameter requirements of particular computing machines. Thus, prior art masking circuits have limited applicability beyond their specifically designed tasks.

It is therefore an object of the present invention to provide a masking circuit having universal applicability to a wide variety of masking tasks.

It is a further object of the present invention to provide a masking circuit modularly adaptable to a wide range of masking tasks.

It is still a further object of the present invention to provide a high speed modular mask generator circuit suitable for small, medium and large scale integration processes.

SUMMARY OF THE INVENTION

The above and other objects of the invention are realized through a mask generator module having two binary control inputs, a plurality of input address lines for conveying data in binary form and a plurality of output masking lines, the number of output lines being equal to two raised in power to the number of input lines. Control logic is provided to force all output lines to a logical zero level when a logic zero level is present at both control inputs and to a logical one level when a logic one level is present at both control inputs. Further logic generates, starting at the first output line, a number of contiguous logical one levels equal to the binary number conveyed on the input address lines when the first control line is at a logical one level and the other at a logical zero level. A like number of contiguous logical zero levels are generated on the output lines when the first control line is at a logical zero level and the second at a logical one level.

BRIEF DESCRIPTION OF THE DRAWINGS

The above objects, advantages and features of the present invention will become more readily apparent from a review of the following specification in relation with the drawings wherein.

DETAILED DESCRIPTION OF THE PREFERRED EMBODIMENT

The basic function of the mask generator module of the present invention is to provide an output pattern of ones and zeroes in response to input binary numerical data, the output pattern being useful in bit checking, field extraction, and like applications. The modular aspect of the present invention permits universal utility over a wide range of masking applications wherein complex masking arrays may be fashioned from a plurality of simple modular mask generators. Furthermore, the present invention permits physical realization of each mask generator module in SSI, MSI, and LSI form in accord with particular system requirements and specifications.

Figure 1A:
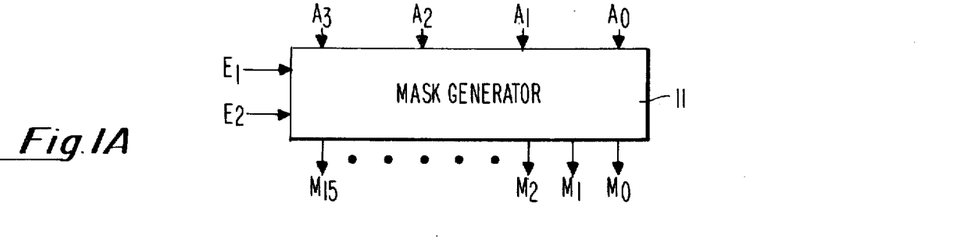
FIG. 1A is a block diagram of the mask generator module of the present invention.

Referring to FIG. 1A, the mask generator module 11 of the present invention includes a plurality of input address lines, a plurality of output masking lines, a first control line E1, and a second control line E2. The input address lines receive, in parallel, binary numerical data with input address line A0 receiving the least significant bit, address line A1 receiving the next least significant bit, address line A2 receiving the second most significant bit, and input address line A3 receiving the most significant address bit. As will be detailed hereinafter, mask generator modules may be fabricated with more or fewer input address lines. The mask generator module 11 also includes a plurality of output masking lines referenced M0 through M15 consecutively. The number of output lines for a given mask generator module 11 is equal to two raised in power to the number of input address lines. Thus, in FIG. 1A, there are four input address lines A0 through A3 and 16 output masking lines M0 through M15.

Figure 1B:
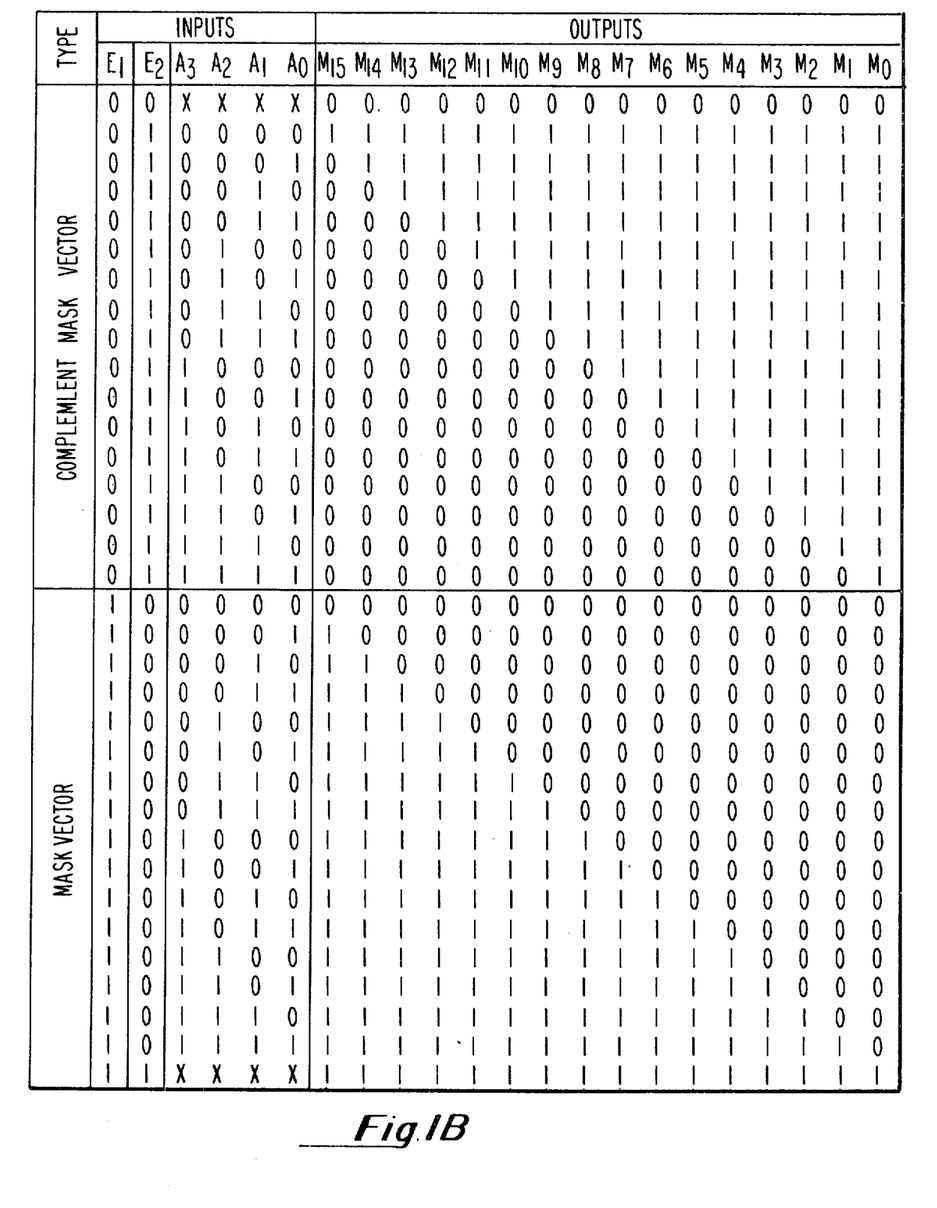
FIG. 1B is a binary function table for the mask generator module of FIG. 1A.

The logic levels appearing on the output masking lines M0 through M15 depends upon the binary numerical data present on the input address lines A0 through A3 and the logic levels on the first and second control lines E1 and E2, see FIG. 1B. When both E1 and E2 are at logical zero the output masking lines M0 through M15 are also at logical zero regardless of the binary numerical data present at the input address lines A0 through A3. Likewise, when both E1 and E2 are at a logical one level the output masking lines M0 through M15 are all at a logical one level regardless of the binary numerical data present on the input address lines A0 through A3. With a logical zero level on the first control line E1 and a logical one level present on the second control line E2, the logic levels on the output masking lines M0 through M15 are a function of the binary numerical data present at the input address lines A0 through A3. When the input binary numerical data is zero, a logical one level is present on all output masking lines M0 through M15. A binary numerical value of one (a logical one on input address line A0 and a logical zero on input address lines A1 through A3) generates a logical one level on output masking lines M0 through M14 and a logical zero on output masking line M15. An input binary representation of two (A1 at one, and A0, A2, A3 at zero) generates a logical one level on output masking lines M0 through M13 and a logical zero level on output masking lines M14 and M15. This pattern is continued down through a binary representation of 15 (a logical one level present on all input address lines A0 through A3) wherein a logical one level is present on output masking lines M0 and a logical zero level is present on masking lines M1 through M15.

When the first control line E1 is at a logical one level and the second control line E2 is at a logical zero level, a binary representation of zero on the input address lines A0 through A3 generates all zeroes on output masking lines M0 through M15. An input binary address representation of one generates a logical one on output masking line M15 and logical zero levels on output masking lines M0 through M14. A binary representation of two at the input address lines A0 through A3 generates a logical one level on output masking lines M14 and M15 and a logical zero level on output masking lines M0 through M13. This pattern is continued down to the binary representation of 15 wherein output masking line M0 is at logical zero and output masking lines M1 through M15 are at logical one.

As mentioned, the mask generator module 11 may be fabricated with more or less than the four input lines A0 through A3. However, since the number of output masking lines is equal to two raised in power to the number of address input lines, the number of connection pins or terminals that would be required in an integrated circuit fabrication of a mask generator module 11 having six or more address lines would be rather excessive with regard to present day integrated circuit packaging technology. Therefore, mask generator modules 11 having between three and five input address lines are generally preferred.

Figure 2:
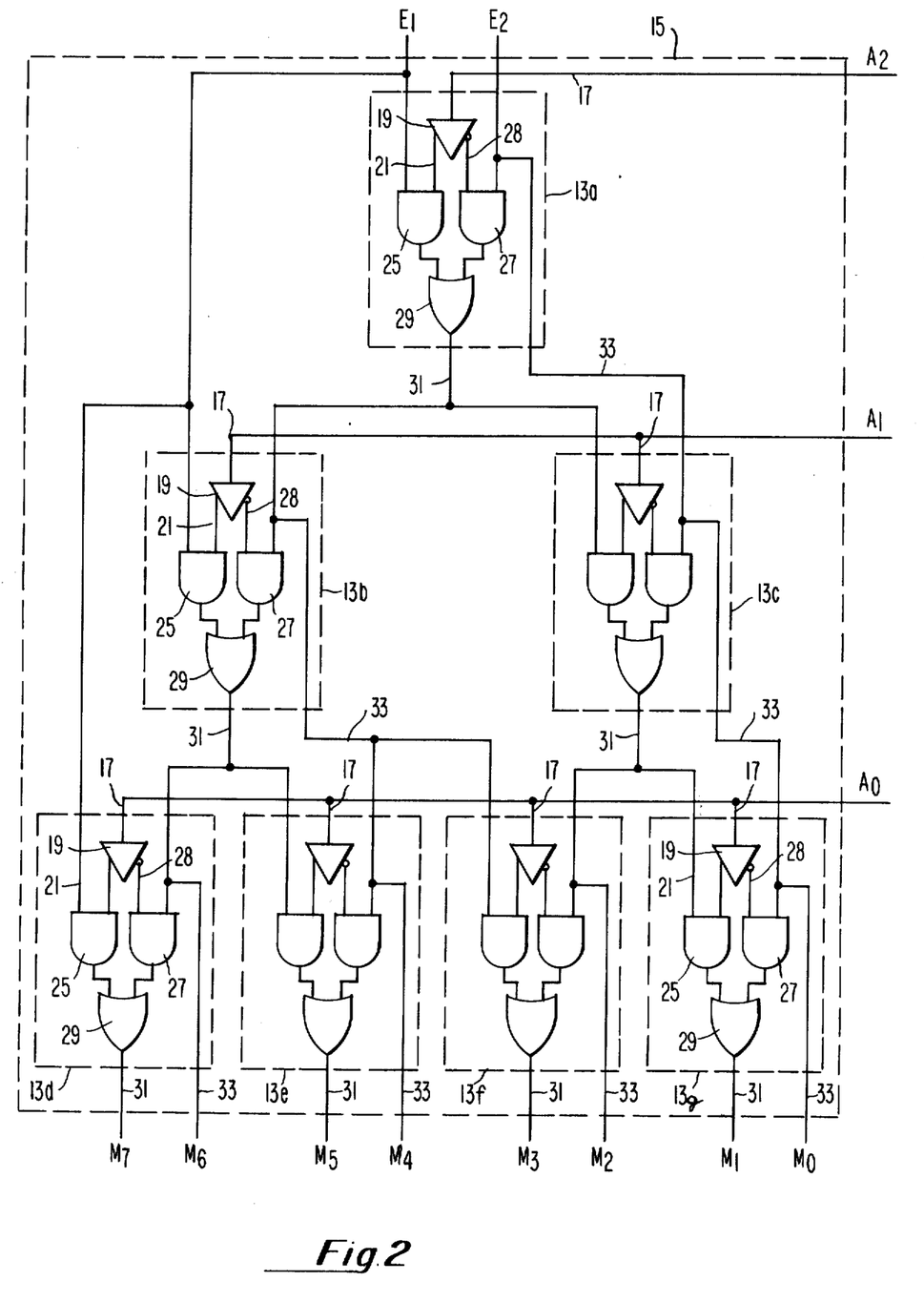
FIG. 2 is a logic diagram of one embodiment of the mask generator module of the present invention.

Nevertheless, a single input mask generator module 13 is ideally suited for small scale integration and serves well to illustrate the modular aspects of the present invention, see FIG. 2. With continued reference to FIG. 2, a mask generator module array 15 is constructed with seven single input mask generator modules 13. The array 15 is addressed by three lines A0, A1, and A2 and provides eight output masking lines M0 through M7 consecutively. Two control lines E1 and E2 are also provided for the control function as above-described.

Each single input mask generator module 13 may be implemented through standard small scale integrated circuit logic fabrication. The single input address line 17 of each single input mask generator module 13 drives an inverter 19 having a non-inverted output 21 and an inverted output 23. The non-inverted output 21 provides one input to a first two input AND gate 25. The second input to the first two-input AND gate 25 is provided by the first control line E1. The inverted output 23 of the inverter 19 provides the first input to a second two input AND gate 27. The second input to the second two input AND gate 27 is provided by the second control line E2. The outputs of the first and second AND gates 25 and 27 are ORed together in OR circuit 29 and outputted therefrom as a first output masking line 31. The second control line E2 is fed through the single input mask generator module 13 and appears at the output thereof as the second output masking line 33.

The masking array 15 comprises seven single input mask generator modules referenced as 13a through 13g. The most significant address line A2 of the masking array 15 drives the inverter 19 of the single input mask generator 13a. The middle significant address line A1 drives the inverters 19 of the single input mask generator modules 13b and 13c. The least significant address line A0 drives the inverters 19 of the single input mask generator modules 13d, 13e, 13f and 13g. The first control line E1 is inputted to the first AND gates 25 of single input mask generator modules 13a, 13b, and 13d. The second control line E2 is inputted to the second AND gate 27 of single input mask generator modules 13a, 13c, and 13g. The first output masking line 31 of the single input mask generator 13a is inputted to the second AND gate 27 of the single input mask generator module 13b and to the first AND gate 25 of the single input mask generator module 13c. The first output masking line 31 of single input mask generator module 13b is inputted to the second AND gate 27 of the single input mask generator module 13d and the first AND gate 25 of the single input mask generator module 13e. The second output masking line 33 of the single input masking generator module 13b is inputted to the second AND gate 27 of the single input mask generator module 13e and the first AND gate 25 of the single input mask generator module 13f. The first output masking line 31 of the single input mask generator module 13c is inputted to the second AND gate 27 of the single input mask generator module 13f and the first AND gate 25 of the single input mask generator module 13g.

The mask generator modular array 15 has eight output masking lines M0 through M7 consecutively. Mask output line M0 is provided from the second output masking line 33 of mask generator module 13g. Output masking line M1 is provided from the first output masking line 31 of the mask generator module 13g. The output masking lines M2 and M3 are provided respectively by the second output masking line 33 and the first output masking line 31 of mask generator 13f. The output masking lines M4 and M5 are provided respectively by the output masking lines 33 and 31 of the mask generator module 13e. Finally, the output masking lines M6 and M7 are provided respectively by output masking lines 33 and 31 of the mask generator module 13d.

It is observed that the output masking lines M0 through M7 respond to inputs on address lines A0, A1, and A2, as shown in FIG. 1B with address line A3 of FIG. 1B held at a logical one level. Thus, the mask generator array 15 is suitable for medium scale integration as a single unit. Likewise, each single mask generator module 13 is suitable for integration via small scale integration technology. It is apparent that the mask generator module array 15 may be expanded to the point where LSI would be suitable for fabrication. However, as the size of the array 15 increases, more and more gates interpose the input address lines and the output masking lines.

Figures 3, 3A, 3B:
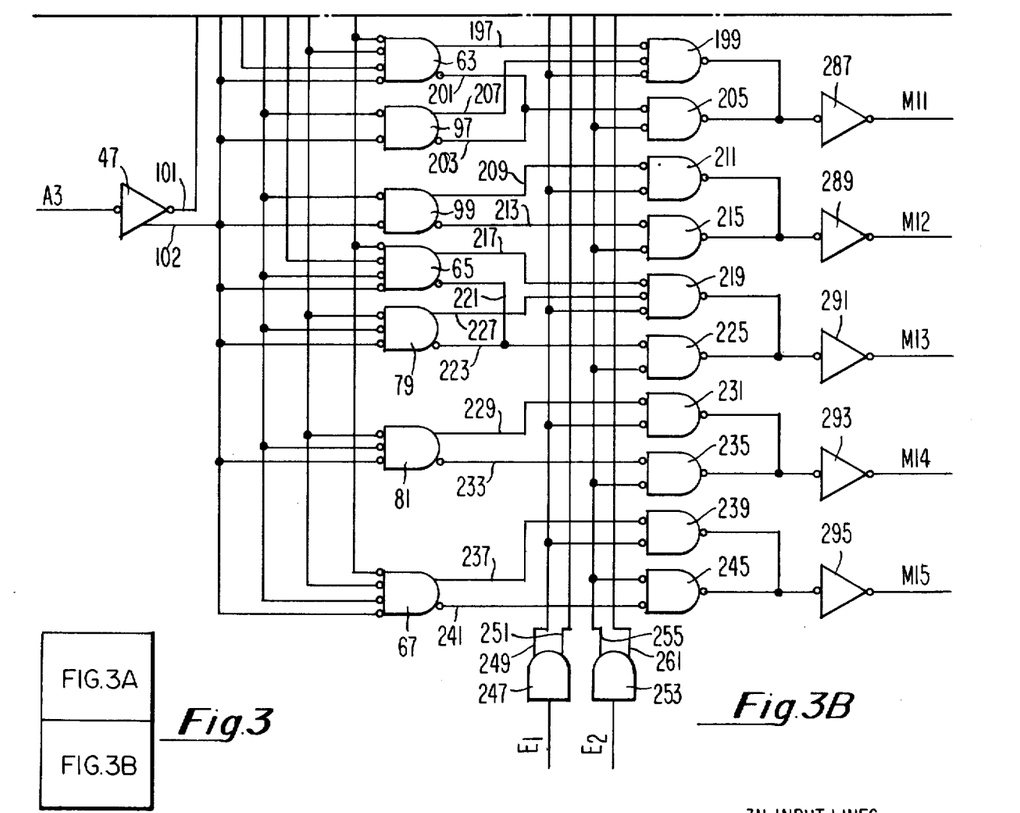
FIG. 3 is an illustration of the relation between FIG. 3A and FIG. 3B.
FIG. 3A and FIG. 3B are logic diagrams of an alternate embodiment of the mask generator module of the present invention.
Figure 3A:
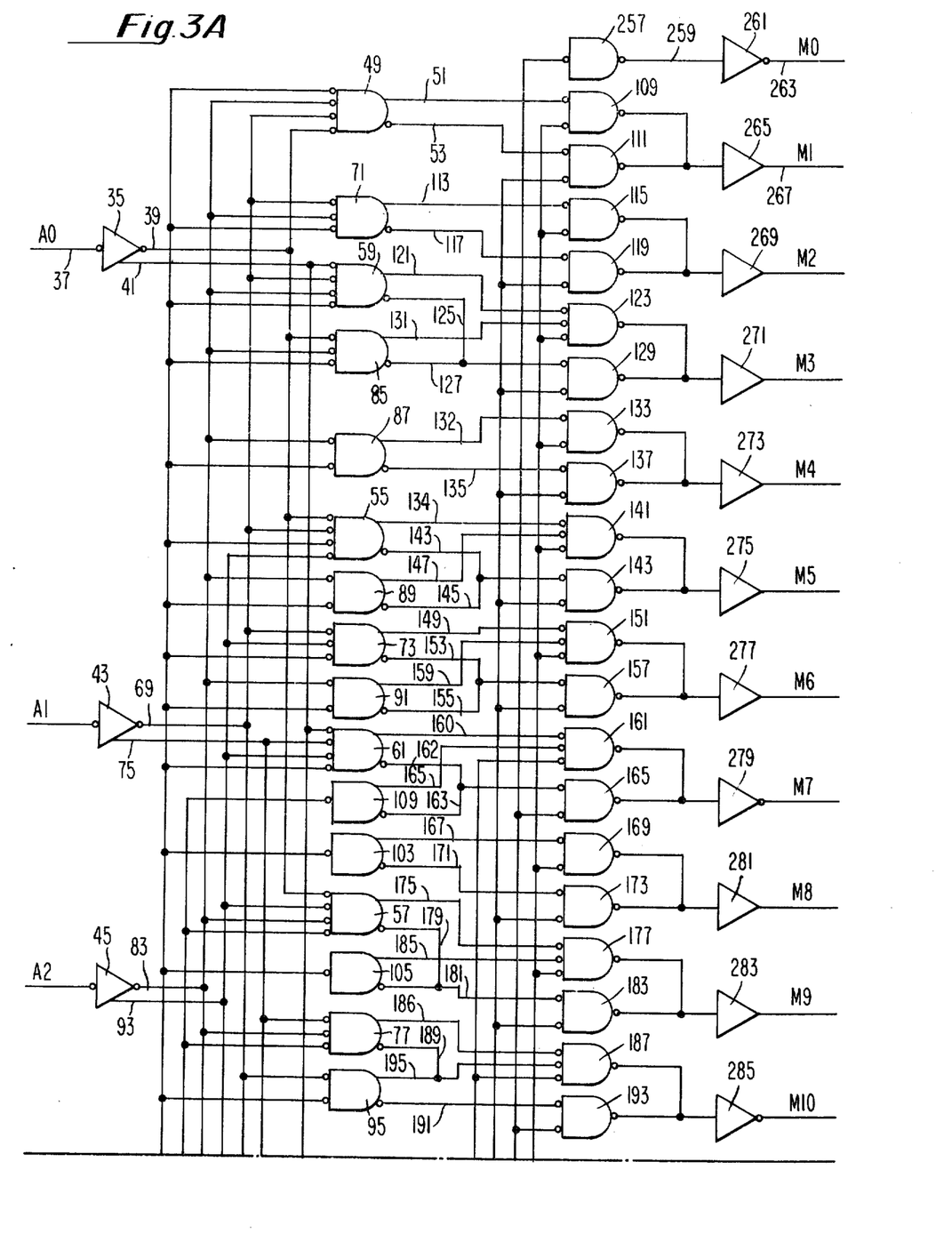

To increase overall speed of operation and to reduce gate count, the more parallel array structure shown in FIG. 3 is used in place of the single input array structure shown in FIG. 2. Note that while the masking array of FIG. 3 is developed for negative logic (a negative value implies a logical one and a ground or more positive value implies a logical zero) the array 15 of FIG. 2 was developed for positive logic. Either positive or negative logic may be used in any given array according to the requirements of a particular application.

With continued reference to FIG. 3, address line A0 conveying the least significant address bit is fed to a single input gate 35. The single input gate 35 inverts at its input 37 the address bit on line A0 and has an inverted output 39 and a direct output 41. Since signals are inverted at the input 37, the signals coming out of the inverted output 39 are thus doubly inverted and therefore the address bit on line A0 appears to be not inverted at the inverted output 39 and inverted at the direct output 41. Address line A1 is fed to a single input gate 43, address line A2 to single input gate 45, and address line A3 to single input gate 47, the gates 43, 45, and 47 being functionally and structurally identical to the single input gate 35.

The inverted output 39 of gate 35 is fed to an inverted input AND gate 49. The AND gate 49 inverts at the input thereof all signals entering thereinto and has a direct output 51 and an inverted output 53. The inverted output 39 of gate 35 is also fed to inverted input AND gates 55 and 57 both of which are identical to the AND gate 49. The direct output 41 of gate 35 is fed to inverted input AND gates 59, 61, 63, 65 and 67 all of which are identical to AND gate 49.

The inverted output 69 of gate 43 is fed to inverted input AND gates 49, 71, 59, 55, 73, 57, and 65. The direct output 75 of gate 43 is fed to inverted input AND gates 61, 77, 63, 79, 81 and 67.

The inverted output 83, of gate 45 is fed to inverted input AND gates 49, 71, 59, 85, 87, 89, 91, 57, 77, and 63. The direct output 93 of gate 45 is fed to inverted input AND gates 55, 73, 61, 95, 97, 99, 65, 79, 81, and 67.

The inverted output 101 of gate 47 is fed to inverted input AND gates 49, 71, 59, 85, 87, 55, 89, 73, 91, 61, 103 and 105. The direct output 107 of gate 47 is fed to inverted AND gates 109, 57, 77, 95, 63, 97, 99, 65, 79, 81, and 67.

The direct output 51 and the inverted output 53 of AND gate 49 are fed to inverted input AND gates 109 and 111 respectively. The direct output 113 and the inverted output 117 of inverted AND gate 71 are fed to the inverted input AND gates 115 and 117 respectively. The direct output 121 of inverted input AND gate 59 is fed to inverted input AND gate 123 whereas the inverted output 125 of the AND gate 57 is fed to the inverted output 127 of the AND gate 85.

By tying the inverted outputs 125 and 127 together a "wired OR" circuit is developed. That is, the wiring together thereof is functionally equivalent to feeding output 125 and output 127 through an OR circuit. The output 127 is fed to inverted input gate 129.

The direct output 131 of AND gate 85 is fed to inverted input AND gate 123. The direct output 132 and the inverted output 135 of AND gate 87 are fed to inverted input AND gates 133 and 137 respectively. The direct output 139 of the AND gate 55 is fed to inverted input AND gate 141 whereas the inverted output 143 thereof is fed to the inverted output 145 of AND gate 89 to produce a wired-OR. The inverted output 145 is fed to the inverted input AND gate 143. The direct output 147 of AND gate 89 is fed to inverted input AND gate 141. The direct output 149 and the inverted output 153 of AND gate 73 are fed to the inverted input AND gate 151 and the inverted output 155 of AND gate 91 respectively. The output 155 is fed to inverted input AND gate 157. The direct output 159 of AND gate 91 is fed to AND gate 151. The direct output 160 of AND gate 61 is fed to inverted input AND gate 161 whereas the inverted input 162 is fed to the inverted output 163 of AND gate 109. The output 163 is fed to inverted input AND gate 165. The direct output 165 of AND gate 101 is fed to AND gate 161. The direct output 167 and the inverted output 171 of AND gate 103 are fed to the AND gates 69 and 173 respectively. The direct output 175 of AND gate 57 is fed to inverted input AND gate 177 whereas the inverted output 179 is fed to the inverted output 181 of AND gate 109. The output 181 is fed to inverted input AND gate 183. The direct output 185 of AND gate 105 is fed to AND gate 177.

The direct output 186 of AND gate 77 is fed to inverted input AND gate 187 whereas the inverted output 189 is fed to the inverted output 191 of AND gate 95. The output 191 is fed to inverted input AND gate 193. The direct output 195 of AND gate 95 is fed to AND gate 187. The direct output 197 of AND gate 63 is fed to inverted input AND gate 199 whereas the inverted output 201 is fed to the inverted output 203 of AND gate 97. The output 203 is fed to inverted input AND gate 205. The direct output 207 of AND gate 97 is fed to inverted input AND gate 199. The direct output 209 and the inverted output 213 of AND gate 99 are fed to the inverted input AND gates 211 and 215 respectively. The direct output 217 of AND gate 65 is fed to inverted input AND gate 219 whereas the inverted output 221 is fed to the inverted output 223 of AND gate 79. The output 223 is fed to inverted input AND gate 225. The direct output 227 of AND gate 79 is fed to AND gate 219. The direct output 229 and the inverted output 233 of AND gate 81 are fed to the inverted input AND gates 231 and 235 respectively. The direct output 237 and the inverted output 241 of AND gate 67 are fed to inverted input AND gates 239 and 243 respectively.

The first control line E1 is fed to a inverted input gate 247 having an inverted output 249 and a direct output 251. It is noted that since a double inversion occurs, the inverted output 249 is logically the same as the input E1. The output 249 is fed to inverted input AND gates 161, 187, 199, 211, 219, 231, and 239. The output 251 is fed to inverted input AND gates 111, 119, 129, 137, 143, 157, 173, and 183.

The second control line E2 is fed to a gate 253 identical in structure and function to the gate 247. The inverted output 255 of gate 253 is fed to inverted input AND gates 165, 193, 205, 215, 225, 235, and 245. The output 255 is also fed to the single inverted input gate 257 having an inverted output 259. It is noted that due to the double inversion at gate 253 and gate 257, the output 259 is logically identical to the logic level on the second control line E2. The direct output 261 of gate 253 is fed to inverted input AND gates 109, 115, 123, 133, 141, 151, 169, and 177.

The output 239 is passed through a single inverted input gate 261 and is outputted on the inverted output 263 thereof as output masking line M0. A single inverted input gate 265 is inputted in a wired-OR fashion from AND gates 109 and 111. The direct output 267 of gate 265 is the masking output line M1. In similar fashion, the single inverted input gate 269 is inputted by AND gates 115 and 119, single inverted input gate 271 is inputted by AND gates 123 and 129, single inverted input gate 273 is inputted by AND gates 133 and 137, single inverted input gate 275 is inputted by AND gates 141 and 143, single input gate 277 is inputted by AND gates 151 and 157, single input gate 279 is inputted by AND gates 161 and 165, single inverted input gate 281 is inputted by AND gates 169 and 173, single inverted input gate 283 is inputted by AND gates 177 and 183, single inverted input gate 285 is inputted by AND gates 187 and 189, single inverted input gate 287 is inputted by AND gates 199 and 205, single inverted input gate 289 is inputted by AND gates 211 and 215, single inverted input gate 291 is inputted by AND gates 219 and 225, single inverted input gate 293 is inputted by AND gates 231 and 235, and finally single inverted input gate 295 is inputted by AND gates 239 and 245.

The output masking line M0 is derived as the inverted output of gate 261, M1 as the direct output of gate 265, M2 as the direct output of gate 269, M3 as the direct output of gate 271, M4 as the direct output of gate 273, M5 as the direct output of gate 275, M6 as the direct output of gate 277, M7 as the inverted output of gate 279, M8 as the direct output of gate 281, M9 as the direct output of gate 283, M10 as the inverted output of gate 285, M11 as the inverted output of gate 287, M12 as the inverted output of gate 289, M13 as the inverted output of gate 291, M14 as the inverted output of gate 293, and finally M15 as the inverted output of gate 295.

A binary level transferring from the input lines A0 through A3 to the output lines M0 through M15 passes through no more than four gates. Thus with high speed logic such as CML, the generation of the output masking lines M0 through M15 occurs at very high speeds with little propagation and switching time delays. It is also noted that the second control line E2 passes through gates 253, 257 and 261 to output masking line M0 with an even number of logic inversions. Thus, M0 is logically equivalent to the second control line E2. This fact is clearly demonstrated in the binary function table of FIG. 1B. The mask generator module 11 shown in FIG. 3, is ideally suited for medium scale integration having four input lines A0 through A3, 16 lines M0 through M15, two control lines E1 and E2, and two power lines (not shown), for a total of 24 pin connections or terminals.

Figure 4:
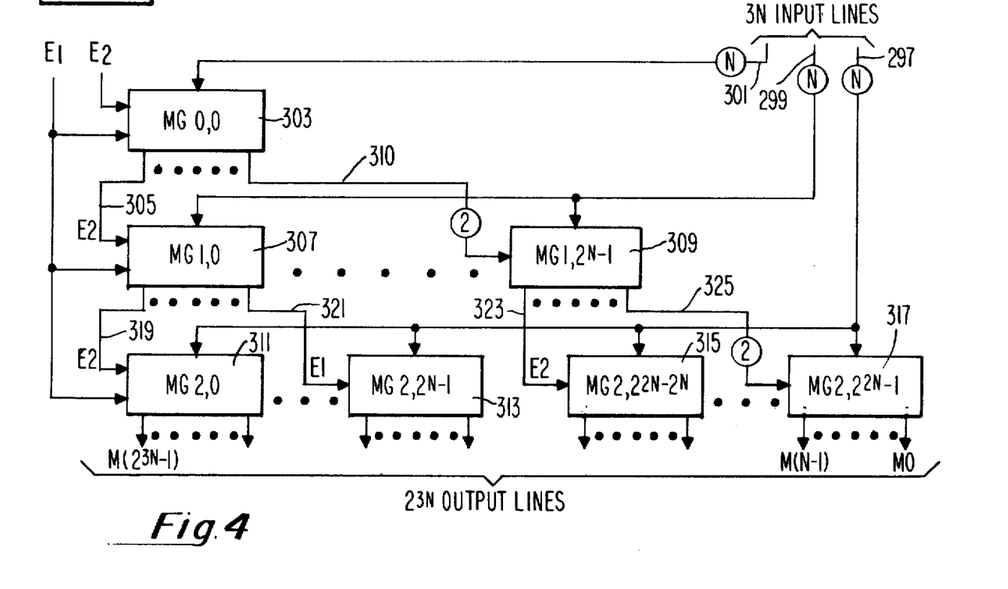
FIG. 4 is a generalized array block diagram illustrating the modular aspect of the present invention.

The mask generator modules 11 may be combined to form a mask generator array of any desired size. With reference to FIG. 4, a mask generator array is shown capable of generating $2^{3N}$ masking lines, where N equals any desired positive integer. Binary address input is provided on three lines, line 297 providing the least significant N bits thereof, line 299 providing the middle N significant bits, and line 301 providing the N most significant bits. Line 301 is inputted to a first mask generating module 303. This generating module 303 is similar to the mask generator modules above described and has N input address lines and $2^N$ output masking lines. The mask generator module 303 may be fabricated as a single unit such as shown in FIG. 3, or as an array such as shown in FIG. 2. Mask generator module 303 is controlled by a first control line E1 and a second control line E2 as above-described. Masking output line 305 of mask generator 303 is the highest valued output line thereof and is fed as the second control line input E2 to a second mask generator module 307. The second mask generator module 307 is provided with input address line 299 providing N input lines. Operating in parallel with the second mask generator module are N mask generator modules (not shown), from the second mask generator module 307 down to the last parallel mask generator module 309. The mask generator module 309 is controlled by the first two masking output line 310 from mask generator module 303. The line 310 contains the M0 and M1 outputs of mask generator module 303 which are fed as the E2 and E1 inputs respectively of mask generator module 309.

A repetitive pattern is established whereby the output lines M1 and M2 are provided as the control inputs E2 and E1 of a mask generator module (not shown) adjacent to mask generator module 309 and masking output lines M2 and M3 are provided as inputs E2 and E1 to the still next adjacent mask generator (not shown) and so on, up to the mask generator module 307 where the highest masking output line 305 of mask generator module 303 is provided for the E2 input of mask generator module 307.

The pattern thus established between mask generator module 303 and the plurality of mask generator modules represented by mask generator module 307 through mask generator module 309 is repeated one stage further whereby the mask generator module 307 provides control inputs for N mask generator modules 311 through 313 and the mask generator module 309 provides control inputs for N mask generator modules 315 through 317. In a manner as thus described, the highest order mask output line of mask generator module 307 is provided via 319 to the E2 input to mask generator module 311. The least ordered output masking line M0 is provided via control line 321 to the E1 input of mask generator module 313. Likewise, the highest ordered masking output of mask generator module 309 is provided via line 323 to the control input E2 of mask generator module 315 and the least ordered two output masking lines M0 and M1 of mask generator module 309 are provided via line 325 to the control inputs E2 and E1 of mask generator module 317. All mask generating modules from 311 through 317 are addressed in parallel by the least significant N input address lines 297.

The E1 control line is fed to generator modules 303, 307, and 311. The E2 control line is fed to module 303 with the M0 output thereof feeding via line 311 mask generator module 309. The M0 output of module 309 is fed via line 325 to mask generator module 317. As can be seen by reference to the function table of FIG. 1B, the M0 output of mask generator module 317 is therefore identical logically to the control line E2.

The output of mask generator module 317 provides the masking output lines M0 through M (N-1). Masking generators 315, 314, and 311 provide increasingly higher ordered output masking lines through the highest ordered output masking line from mask generator output 311, line M($2^{3N}$-1).

It is observed that the array of FIG. 4 may be extended further if required. It is also observed that the simple array shown in FIG. 2 is in essence the array of FIG. 4 with N equaling 1, A2 provided on input line 301, A1 provided on input line 299, and A0 provided on input line 297.

Figure 5:
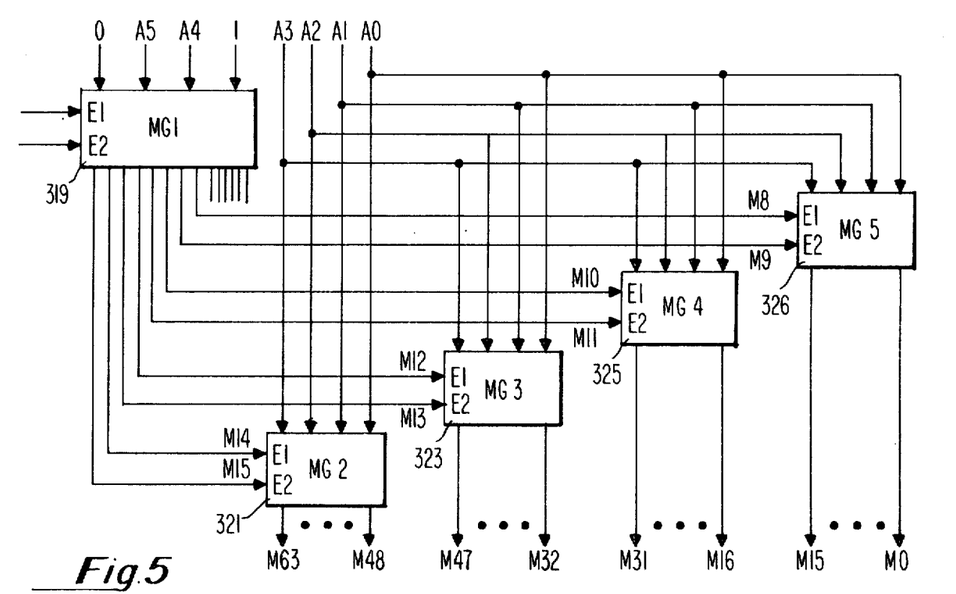
FIG. 5 is a block diagram detailing a specific modular masking array.

In addition to the ordered array of FIG. 4, additional masking generator combinations may be formed to even further minimize the number of mask generator modules needed for any given array, see FIG. 5. In FIG. 5, each masking generator module therein has four input address lines and therefore 16 output masking lines. The first mask generator module 319 thereof has four input address lines; a logical ONE, A4, A5, and a logical ZERO. The mask generator module 319 is controlled by a first control line E1 and a second control line E2. A second mask generator module 321, a third mask generator module 323, a fourth mask generator module 325, and a fifth mask generator module 326 are all addressed in parallel by input address lines A0, A1, A2, and A3. As can be appreciated A0 represents the least significant input address bit and A5 represents the most significant input address bit.

The M15 and M14 outputs of mask generator module 319 are provided as the E2 and E1 inputs respectively of mask generator 321. The M13 and M12 outputs of mask generator module 319 are provided as the E2 and E1 inputs respectively, of mask generator module 323. The M11 and M10 outputs of mask generator module 319 are provided as the E2 and E1 inputs of mask generator module 325. The M9 and M8 outputs of mask generator module 319 are provided as the E2 and E1 inputs respectively of mask generator module 326.

As can be seen from the function table of FIG. 1B, with the mask generator modules 319 through 326 connected as above-described, mask generator module 326 provides output masking lines M0 through M15, mask generator module 325 provides output lines M16 through M31, mask generator module 323 provides output lines M32 through M47, and mask generator module 321 provides output lines M48 through M63. It is noted that the M0 output of mask generator module 326 is logically identical to the E2 input of mask generator module 319. It is further noted that if the array of FIG. 4 were used to generate the 64 masking output lines of FIG. 5, N would equal 2 and there would be 21 mask generators each having two input address lines and four output masking lines. Thus the flexibility of the present invention is realized by a comparison of the specific embodiments shown in FIG. 4 and FIG. 5.

Figure 6:
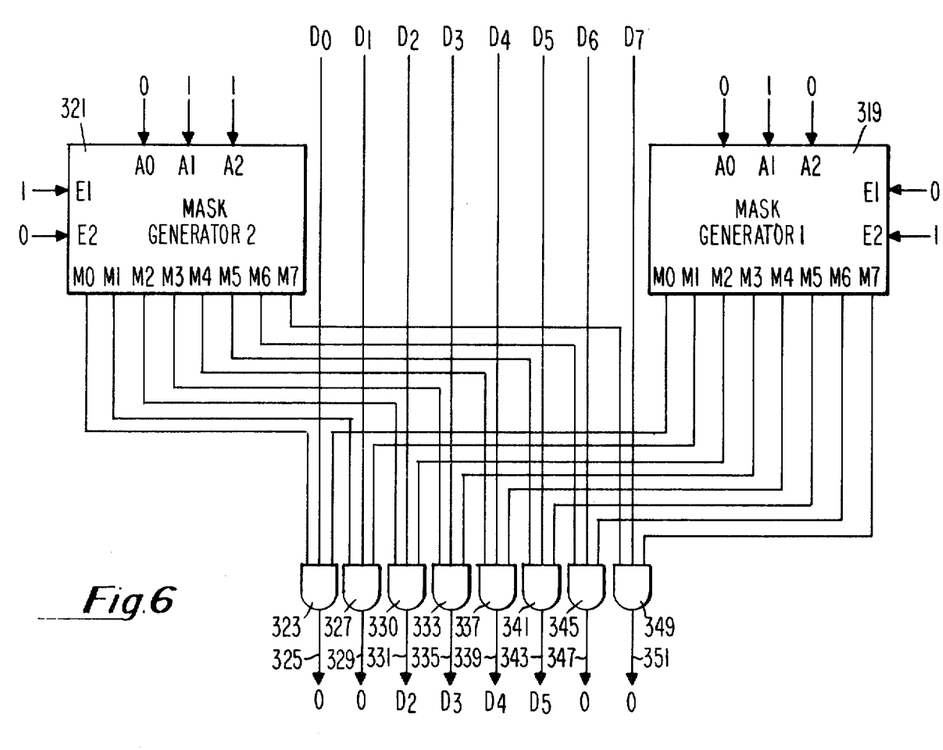
FIG. 6 is a diagram illustrating data field extraction utilizing the mask generator module of the present invention.

A practical problem readily solved by use of mask generator modules of the present invention involves the reading of certain data lines in a plurality of data lines, see FIG. 6. A first mask generator module 319 of the size shown in FIG. 2 and a second like mask generator module 321 are provided to generate the desired masking operation. Eight input data lines D0 through D7, each containing a single bit of information, are provided. In the embodiment shown in FIG. 6 only information on D2, D3, D4 and D5 is desired. Thus, mask generator module 321 is addressed on line A0 by a logical ZERO, on A1 by a logical ONE, and on A2 by a logical ONE. The first control line E1 of mask generator module 321 is provided with a logical ONE level and the second control line E2 is provided with a logical ZERO level. Mask generator module 319 is addressed on A0 by a logical ZERO, on A1 by a logical ONE, and on A2 by a logical ZERO. The first control input E1 to mask generator module 319 is a logical ZERO whereas the second control line E2 is a logical ONE.

A first AND gate 323 combines the M0 outputs of mask generator modules 319 and 321 and the data line D0. The output 325 of AND gate 323 is therefore a logical ZERO. A second AND gate 327 combines the M1 outputs of mask generator modules 319 and 321, and the data line D1. The output 329 of the AND gate 327 therefore is a logical ZERO. A third AND gate 330 combines the M2 outputs of the mask generator modules 319 and 321 and the data line D2. The output 331 of gate 330 is therefore D2. In similar fashion, the M3 outputs of mask generator modules 319 and 321 are combined with the D3 data line in AND gate 333 to produce at the output 335 thereof D3. The M4 outputs of mask generator modules 319 and 321 are combined with D4 in AND gate 337 to produce at the output 339 thereof D4. Likewise, M5 outputs are combined with D5 in AND gate 341 to produce at the output 343 thereof D5. The M6 outputs are combined with D6 in AND gate 345 to produce at the output 347 thereof a logical ZERO level. Finally, the M7 outputs are combined with D7 in AND gate 349 to produce at the output 351 thereof a logical ZERO.

Thus at the output of AND gates 323 through 349 only the logical levels of D2 through D5 appear. Obviously, different data lines may pass through the AND gates 323 through 349 depending on the logic level inputs to the address lines A0 through A2 of the mask generator modules 319 and 321 and the logic levels to the control inputs E1 and E2. It is further appreciated that the AND gates 323 through 349 may be fabricated as part of the mask generator modules 319 and 321 on a single chip or on two chips with half of the AND gates 323 through 349 sharing a single chip with each of the mask generator modules 319 and 321.

While particular embodiments of the present invention have been described and illustrated, it will be apparent to those skilled in the art that changes and modifications may be made therein without departure from the spirit and scope of the invention as claimed.

What is claimed is:

1. A mask generator module comprising:
   a plurality of address lines for receiving a numerical representation;
   a first control line for receiving a first binary level control signal;
   a second control line for receiving a second binary level control signal;
   a plurality of ordered output masking lines; and
   logic means for forcing all lines in said plurality of ordered output masking lines to a specific binary level when both said first and said second control lines are receiving said specific binary level and for conveying a particular binary level on solely a contiguous set of output masking lines starting with the first output line in said plurality of ordered output masking lines when said first and second control lines are receiving complementary binary levels and said plurality of address lines is receiving a numerical representation, said contiguous set being in number equal to said numerical representation being received on said plurality of address lines.

2. The mask generator module of claim 1 wherein said specific binary level is logically identical to the binary level being received on both said first and said second control lines.

3. The mask generator module of claim 1 wherein:
   said numerical representation is binary in format;
   said plurality of address lines comprises four address lines; and
   said plurality of output masking lines comprises 16 lines.

4. A mask generator module comprising:
   an input for receiving a binary level input signal;
   a first control input for receiving a first binary level control signal;
   a second control input for receiving a second binary level control signal;

a masking output for conveying a binary level masking signal; and logic means for forcing said output to a specific binary level when both said first and said second control inputs are receiving said specific binary level and for conveying on said output the binary level of the input signal when said first binary level control signal is a logical one and said second binary level control signal is logical zero and the complementary binary level of the input signal when said first binary level control signal is a logical zero and said second binary level signal is a logical one.

5. The mask generator module of claim 4 wherein said logic means comprises:
   a logic gate inputted by said binary level input signal, said logic gate having a direct and an inverted output;
   a first AND gate inputted by said first binary level control signal and by said direct output of said logic gate;
   a second AND gate inputted by said second binary level control signal and by said inverted output of said logic gate; and
   an OR gate inputted by said first and second AND gates and outputted to said masking output.

6. A mask generator module comprising:
   a set of N address lines for receiving a binary numerical representation;
   a first control line for receiving a first binary level control signal;
   a second control line for receiving a second binary level control signal;
   a set of $2^N$ ordered output masking lines; and
   logic means for forcing all lines in said set of $2^N$ ordered output masking lines to a specific binary level when both said first and said second control lines are inputting said specific binary level and for conveying a selected binary level on a contiguous set of output masking lines starting with the first output line in said set of $2^N$ ordered output masking lines when said first and said second control lines are inputting complementary binary levels, said contiguous set being in number equal to said binary numerical representation inputted on said set of N address lines.

7. The mask generator module of claim 6 wherein said N is 4 and said $2^N$ is 16.

8. An array for masking a portion of a data word of ordered bits, said array comprising:
   a first and a second mask generator module, each said module including;
   a plurality of address lines for receiving a numerical representation;
   a first binary level input control line, and a second binary level input control line;
   a plurality of ordered output masking lines; and
   logic means for forcing all lines in said plurality of ordered output masking lines to a specific binary level when both said first and said second control lines are inputting said specific binary level and for conveying a particular binary level solely on a contiguous set of output masking lines starting with the first output line in said plurality of ordered output masking lines when said first and said second control lines are inputting complementary binary levels, said contiguous set being in number equal to said numerical representation received on said plurality of address lines; and
   AND circuit means for orderly summing a data word having ordered bits with said ordered output masking lines of said first and said second mask generator modules whereby the first ordered bit of said data word is summed with said first ordered output masking lines of said first and said second module, and the remaining higher ordered bits of said data word are individually summed with like ordered output lines in said plurality of ordered output masking lines of said first and said second module.

* * * * *